(No Model.)
W. B. MACK.
ELECTRIC WIRE CONDUIT.
No. 397,300. Patented Feb. 5, 1889.
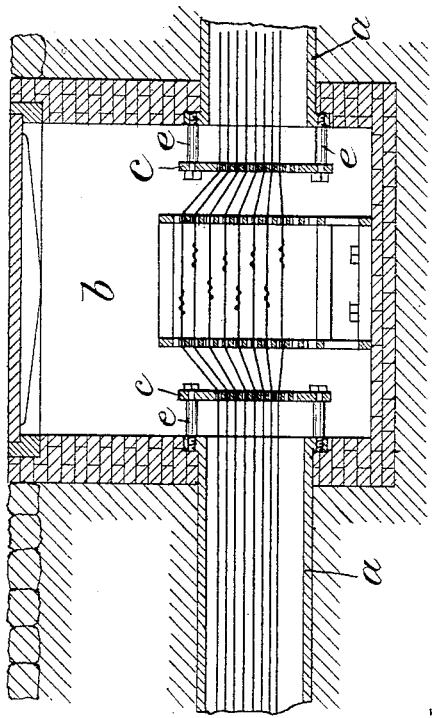
Fig. 1.
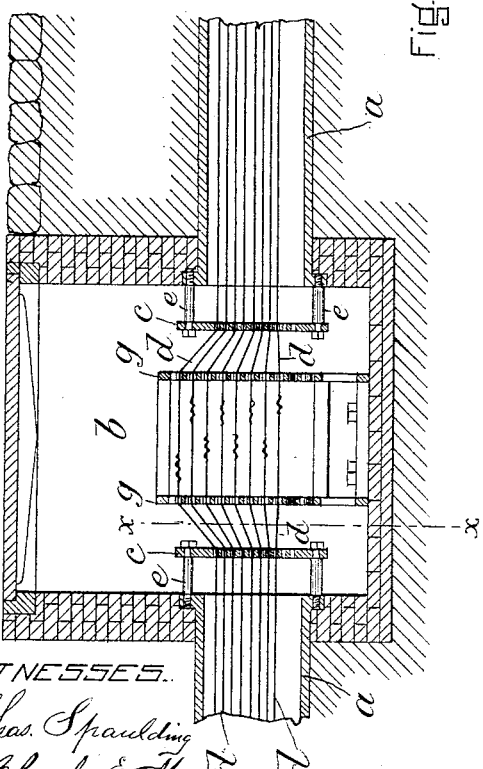
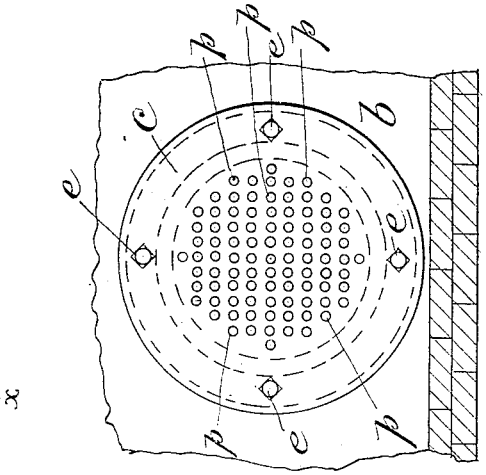
Fig. 3.
Fig. 2.
WITNESSES.
Chas. Spaulding
Charles E. Moss
INVENTOR.
W. B. Mack
by Knight Brown Quinsley
Attys.

UNITED STATES PATENT OFFICE.

WILLIAM B. MACK, OF BOSTON, MASSACHUSETTS.

ELECTRIC-WIRE CONDUIT.

SPECIFICATION forming part of Letters Patent No. 397,300, dated February 5, 1889.

Application filed December 17, 1888. Serial No. 293,814. (No model.)

*To all whom it may concern:*

Be it known that I, WILLIAM B. MACK, of Boston, in the county of Suffolk and State of Massachusetts, have invented certain new and useful Improvements in Electric-Wire Conduits, of which the following is a specification.

This invention has for its object to provide an improved conduit in which electric wires may be suspended independently instead of being assembled in a cable; and it consists in the several improvements, which I will now proceed to describe and claim.

Of the accompanying drawings, forming a part of this specification, Figure 1 represents a longitudinal section of my improved conduit. Fig. 2 represents a section on line $x\,x$, Fig. 1, looking toward the left. Fig. 3 represents a section on the same line, looking toward the right.

The same letters of reference indicate the same parts in all the figures.

In the drawings, $a\,a$ represent sections of iron pipe—such, for example, as is used for gas and water mains—the meeting ends of the sections being connected by suitable joints or couplings, and preferably by what is known as the "Converse joint." The pipe-sections are laid in trenches a suitable distance below the surface of the ground and enter man-holes or working-chambers $b$, located suitable distances apart. Within each vault, and coinciding with the ends of the pipe-sections $a$, are plates $c\,c$, of insulating material—as wood, hard rubber, glass, porcelain, &c. Said plates have numerous perforations, $p$, for the reception of the electric wires $d$. The plates are securely supported by bolts $e\,e$, attached to the walls of the vault or to the ends of the pipe-sections, the bolts being of such length as to separate the plates $c$ from the ends of the pipes sufficiently to permit an operator to get between the plates and the ends of the pipes for the purpose of manipulating the wires. The separation of the plates from the ends of the pipes also enables water to run out of the pipes into the vault, the pipes being preferably slightly inclined for this purpose. Within each vault are two frames, $g\,g$, each having a suitable number of insulators, $h$, of any suitable construction, for the support of the wires within the vault, said insulators being arranged so that the wires in passing from the plates $c$ to the insulators diverge or spread apart, so that the wires are more widely separated between the frames $g\,g$ than they are in the pipes $a$, and are therefore more easily handled and connected or spliced. The frames are securely supported within the vault. The plates $c\,c$ are also securely supported, and are of sufficient strength to support the strain of the wires when the same are drawn taut and secured to the frames $g$.

The vaults or man-holes are at such distances apart that the wires suspended therein will not require support within the pipes, the tension of the wires being sufficient to prevent them from sagging and touching the bottoms of the pipes.

I prefer to locate the wires in the upper portions of the pipes, leaving the lower portions vacant, so that an electric motor or wire-carrier can be sent through from vault to vault whenever it is desirable to introduce an additional wire.

I claim—

A conduit composed of pipe-sections, vaults or man-holes communicating with said sections, insulating-plates secured within the man-holes opposite the ends of the pipes, said plates being perforated for the passage of the wires and separated from the ends of the pipes, and frames within the vaults provided with insulating-wire supports, all arranged substantially as set forth.

In testimony whereof I have signed my name to this specification, in the presence of two subscribing witnesses, this 12th day of December, A. D. 1888.

WILLIAM B. MACK.

Witnesses:
C. F. BROWN,
A. D. HARRISON.